United States Patent [19]
Haskell et al.

[11] Patent Number: 5,629,736
[45] Date of Patent: May 13, 1997

[54] CODED DOMAIN PICTURE COMPOSITION FOR MULTIMEDIA COMMUNICATIONS SYSTEMS

[75] Inventors: Barin G. Haskell, Tinton Falls; Li Yan, Holmdel, both of N.J.

[73] Assignee: Lucent Technologies Inc., Murray Hill, N.J.

[21] Appl. No.: 332,985

[22] Filed: Nov. 1, 1994

[51] Int. Cl.⁶ .............................. H04N 7/12; H04N 11/02
[52] U.S. Cl. ...................... 348/387; 348/390; 348/405
[58] Field of Search .......................... 348/563–568, 348/554, 555, 556, 584, 588, 385, 388, 387, 370, 393, 394, 398, 403, 404, 405, 407; H04N 5/45, 7/12, 11/02, 11/04

[56] References Cited

U.S. PATENT DOCUMENTS

| | | | |
|---|---|---|---|
| 4,729,028 | 3/1988 | Mici et al. | 348/567 |
| 4,876,600 | 10/1989 | Pietzsch et al. | 348/567 |
| 4,975,771 | 12/1990 | Kassatly | 348/385 |
| 5,047,858 | 9/1991 | Aemonoyer | 348/558 |
| 5,146,335 | 9/1992 | Kim et al. | 348/556 |
| 5,216,503 | 6/1993 | Palk et al. | 348/385 |
| 5,365,276 | 11/1994 | Imai et al. | 348/564 |

*Primary Examiner*—Michael Lee
*Attorney, Agent, or Firm*—Steven R. Bartholomew

[57] ABSTRACT

Video composition techniques are disclosed for processing video information from a plurality of sources to provide a video image having a plurality of rectangular regions. Each rectangular region displays video information from a specific one of the plurality of video sources. The video information from each video source is in the form of an incoming digital bit stream. The digital bit stream from a first video source has a first bit rate, and the digital bit stream from a second video source has a second bit rate where the first bit rate may or may not be equal to the second bit rate. The incoming digital bit streams are fed to a rate matching circuit which converts all incoming digital bit streams to a common bit rate. The output of the rate matching circuit is fed to a synchronization arid multiplexer circuit which places video information from specific digital bit streams into corresponding rectangular regions of a composite video image.

3 Claims, 7 Drawing Sheets

CODED DOMAIN PICTURE COMPOSITION FOR MULTIMEDIA COMMUNICATIONS SYSTEMS

CROSS-REFERENCE TO RELATED APPLICATION

Related subject matter is disclosed in the co-pending commonly assigned U.S. Patent application of: Yan et al., entitled "Video Transmission Rate Matching for Multimedia Communication Systems " Serial No. XXXX and filed simultaneously herewith.

BACKGROUND OF THE INVENTION

1. Field of the Invention

This invention relates generally to multimedia communications systems, and more specifically to video processing techniques for use in conjunction with such systems.

2. Description of the Prior Art

Video composition is a technique which simultaneously processes a plurality of video sequences to form a single video sequence. Each frame of the single video sequence is organized into a plurality of multiple windows. Each of the multiple windows includes frames corresponding to a specific one of the plurality of multiple video sequences. Video composition techniques have broad application to the field of multimedia communications, especially where multipoint communications are involved, as in multipoint, multimedia conferencing systems.

In a multipoint multimedia conference, a "bridge " or "multipoint control unit " (MCU) is often used to establish multipoint connection and multi-party conference calls among a group of endpoints. Generally speaking, the MCU is a computer-controlled device which includes a multiplicity of communication ports which may be selectively interconnected in any of a plurality of configurations to provide communication among a group of endpoint devices. Typical MCUs are equipped to process and route video, audio, and (in some case) data to and from each of the endpoint devices.

MCUs may be categorized as having either a "switched presence " or a "continuous presence ", based upon the video processing capabilities of the MCU. In a "switched presence " MCU, the video signal selected by a specially-designated endpoint device considered to be under the control of a "conference chairman " is broadcast to all endpoint devices participating in the conference. Alternatively, a "switched presence " MCU may select the particular video signal to be sent to all of the endpoint devices participating in the conference by examining the respective levels of audio signals received from each of the endpoint devices. However, note that the "switched presence " MCU includes no video processing capabilities. Rather, the MCU functions in a more limited sense, providing only video switching capabilities. Therefore, at a given moment, each of the endpoint devices participating in a given conference will display a video image from the specially-designated endpoint device used by the "conference chairman " or, alternatively, each of the endpoint devices will display a video image from the endpoint device used by a participant who is currently speaking.

Since the existing MCU is only equipped to switch video signals, and cannot implement functions in addition to switching, each of the endpoint devices are required to use the same video transfer rate in order to be able to communicate with other endpoint devices. The state-of-art MCU is described in ITU Document H.243, "Procedures for Establishing Communication Between Three or More Audiovisual Terminals Using Digital Channels up to 2 Mbps ", March 1993, and in ITU Document H.231, "Multipoint Control Units for Audiovisual systems Using Digital Channels up to 2 Mbps ", March 1993.

In a "continuous presence " MCU, video composition techniques are employed by the MCU. These video composition techniques provide for the selection, processing, and combining of a plurality of video streams, wherein each video stream originates from a corresponding endpoint device. In this manner, video information from multiple conference participants is combined into a single video stream. The combined video stream is then broadcast to all endpoint devices participating in the conference. Such conferences are termed "continuous presence " conferences because each of the conference participants can be simultaneously viewed by all other conference participants. At the present time, study groups organized by the ITU are working on the standardization of "continuous presence " MCUs.

Several techniques have been developed to provide video composition features for "continuous presence " MCUs. The most straightforward technique is termed the transcoding method, which involves the decoding of a plurality of input video bit streams. These bit streams are decoded into the pixel domain, and then the video frames from the plurality of video bit streams are combined in the pixel domain to form an integrated video frame. The integrated video frames are then re-encoded for distribution.

Another technique for providing video composition features has been developed by Bellcore. This technique, which may be referred to as bit stream domain mixing, is useful only in the context of systems conforming to the ITU H.261 standard. Bit stream domain mixing operates on image representations, and exploits a process known as quadrant segmentation. The problem with this approach is that it is not compatible with existing terminal equipment, since it requires asymmetric operation of the endpoint devices. Moreover, since the bit stream mixer in the MCU is passive, the combined bit stream may violate the HRD requirement specified in the H.261 standard.

One state-of-the-art approach to video composition uses specially-equipped video terminals. Each video terminal is equipped to divide the video channel into 2–4 sub channels, while transmitting an outgoing video bit stream on only one of the channels. All of the sub channels use the same bit rate, the same picture format, and the same maximum frame rate. The MCU must provide circuitry for de-multiplexing the sub channels it receives from each terminal, circuitry for routing the sub channels appropriately, and circuitry for re-multiplexing the sub channels prior to transmission to each terminal. Each terminal includes a video receiver which receives up to 4 sub channels for decoding and display. The advantage of this approach is that it provides minimal insertion delay, but this advantage is more than offset by the requirement for elaborate modifications to existing video terminals.

SUMMARY OF THE INVENTION

Video composition techniques are disclosed for processing video information from a plurality of sources to provide a video image having a plurality of rectangular regions. Each rectangular region displays video information from a specific one of the plurality of video sources.

The video information from each video source is in the form of an incoming digital bit stream. The digital bit stream from a first video source has a first bit rate, and the digital bit stream from a second video source has a second bit rate where the first bit rate may or may not be equal to the second bit rate. The incoming digital bit streams are fed to a rate matching circuit which converts all incoming digital bit streams to a common bit rate. The output of the rate matching circuit is fed to a synchronization and multiplexer circuit which places video information from specific digital bit streams into corresponding rectangular regions of a composite video image.

DETAILED DESCRIPTION

The video composition techniques of the present invention will be described in the context of an operational environment substantially conforming to the ITU H.261 standard. That is, the inputs and output of a video composition system consist of coded video bit streams which are compressed using a coding format described in the ITU-T document "Recommendation H.261, Video Codec for Audiovisual Services at px64 kbits/s ", May 1992 and "Description of Reference Model 8", Jun. 9, 1989. The present invention is described in the context of the H.261 standard for illustrative purposes only, it being understood that the techniques disclosed herein are useful in the context of operational environments not conforming to the H.261 standard.

Figure 1:
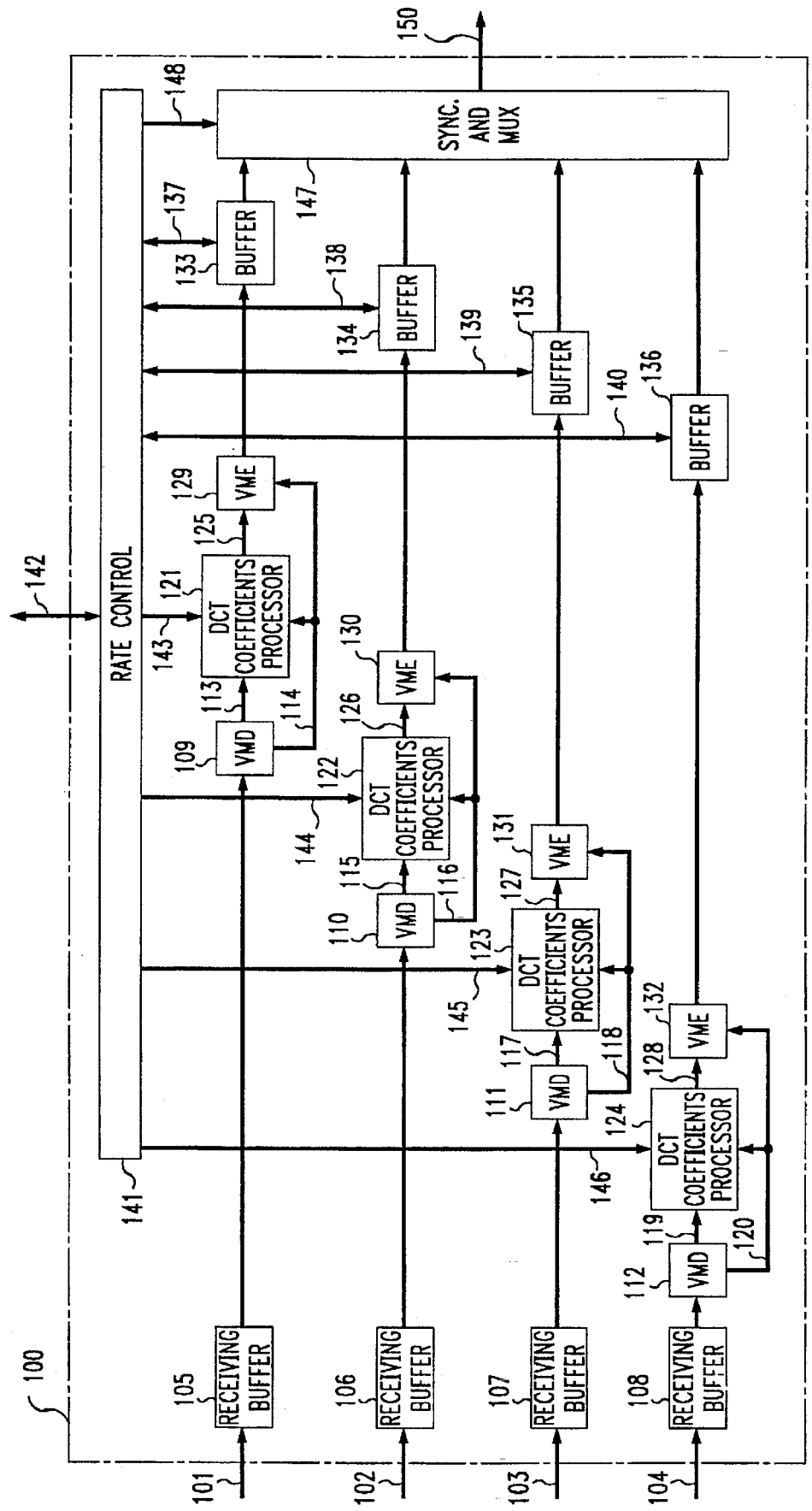
FIG. 1 is a block diagram of a video composition apparatus according to a preferred embodiment disclosed herein.

FIG. 1 shows a hardware block diagram of a coded domain video composition system. The inputs to the system are first, second, third and fourth coded video bit streams 101, 102, 103, 104, respectively, having respective transmission rates of R1, R2, R3, R4 kbits/sec. The output signal 150 of the system is the coded video bit stream which may have the same transmission rate as any one of the inputs. The output rate may be denoted as R kbits/sec. The inputs represent video information, and are coded in a format known as QCIF which is described in the above-referenced H.261 standard. The output is coded in a format known as CIF, also described in the H.261 standard. The output video bit stream is a composite video signal representing the composition of the four input video sequences. The coded video bit streams are the binary representations of video signals which are compressed by a coding algorithm described in the H.261 standard and then coded according to an H.261 syntax.

Figure 2:
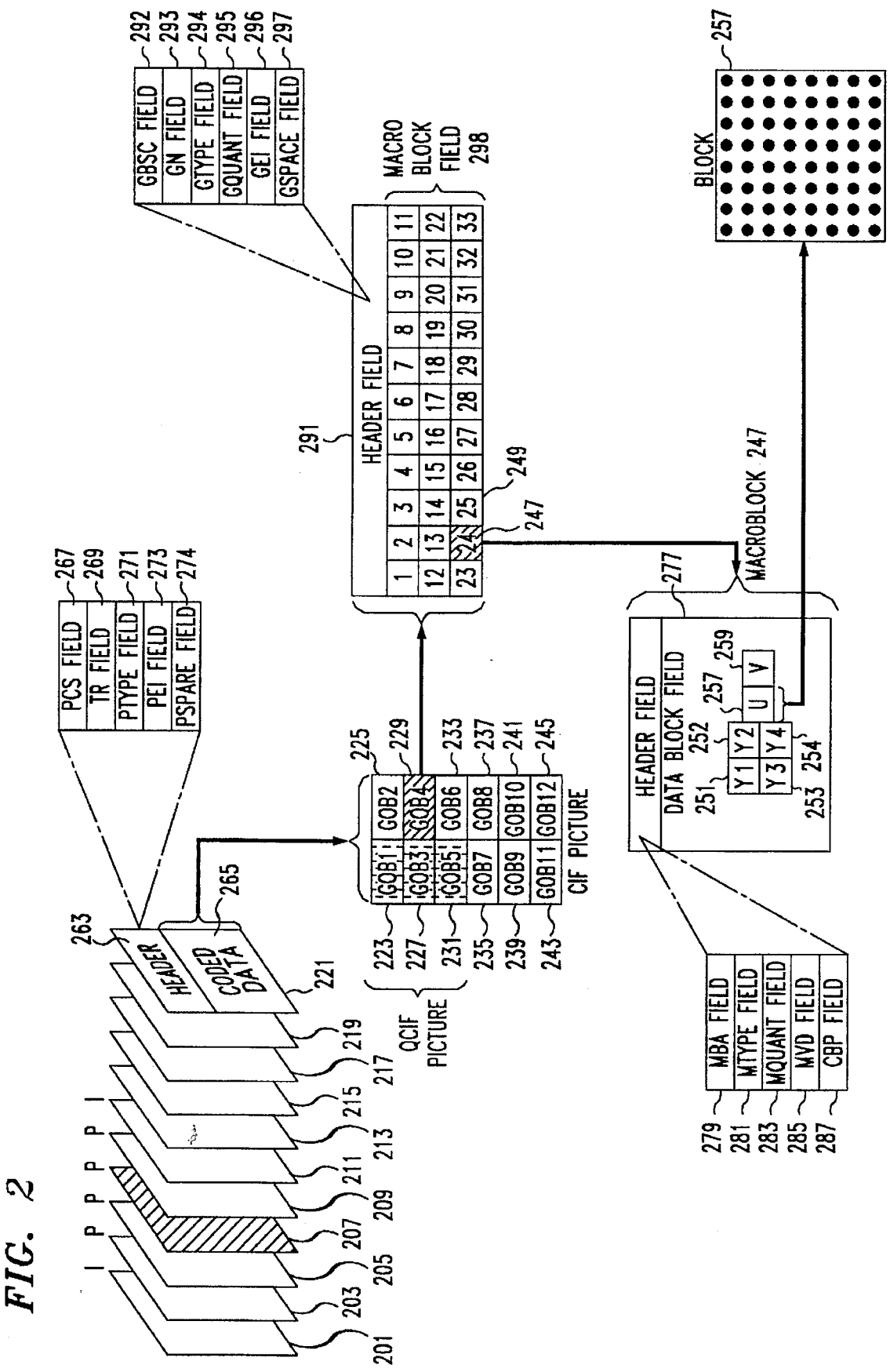
FIGS. 2 and 3 are pictorial diagrams representing the coding format of a signal conforming to the ITU H.261 standard.
Figure 3:
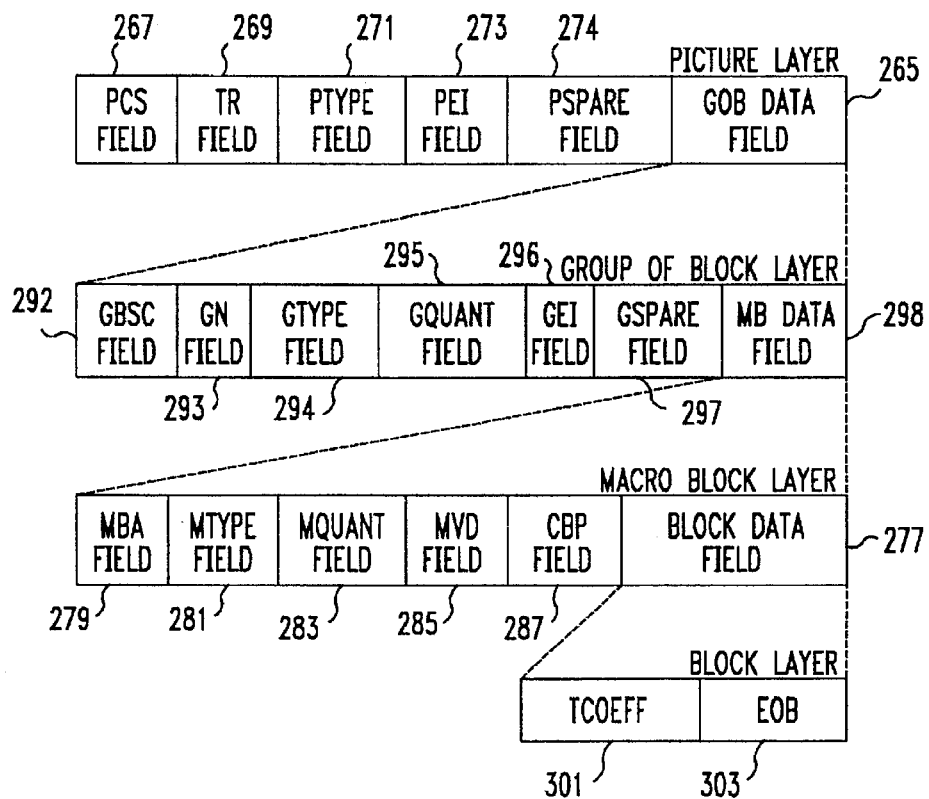

FIGS. 2 and 3 are data structure diagrams setting forth illustrative coding formats for representing video information in accordance with the H.261 standard. Referring now to FIG. 2, video information consists of a plurality of frames 201, 203, 205, 207, 209, 211, 213, 215, 217, 219, 221. Each of these frames contains a representation of a two-dimensional video image in the form of a pixel array. Since a given frame may represent a video image at a specific moment in time, a plurality of frames may be employed to represent a moving image. Together, the frames comprise a moving video image.

Each of the frames is compressed according to any one of two types of compression algorithms, termed intra-frame coding (I) and predictive coding (P). For example, frames 201 and 211 are compressed using intra-frame coding (I), and frames 203, 205, 207, 209, 213, 215, 217, 219, and 221 are compressed using predictive coding. The sequence of frames shown in FIG. 2 establish a data structure for representing a video image in the form of an encoded video sequence having a plurality of levels arranged in a two-dimensional array, wherein each level represents the value of a pixel element. This encoded video sequence may be termed a coded video bit stream.

If intra-frame coding (I) is to be applied to a given frame, such as frame 201, the frame is termed an I-designated frame, and if predictive coding (P) is to be applied to a given frame, such as frame 205, the frame is termed a P-designated frame.

Pursuant to intra-frame coding (I) compression processes, the I-designated frame 201 is divided into a plurality of pixel blocks, wherein each block consists of an array of 8×8 pixels. Next, a discrete cosine transform (hereinafter, DCT), is performed on each of the pixels in the 8×8 pixel block, in accordance with procedures well-known to those skilled in the art, to generate a plurality of DCT coefficients. Thereafter, quantization is performed on the DCT coefficients, in accordance with well-known quantization procedures. These quantized DCT coefficients constitute compressed video image information for the I-encoded frame 201.

Predictive coding (P) is implemented on a P-designated frame, such as frame 205, by: 1) partitioning the P- designated frame into a plurality of macro blocks. For example, if the frame includes a plurality of pixel arrays, each having 16×16 pixels (FIG. 2, 251, 252, 253, 254, 257, 258), the block may be partitioned into 4 contiguous blocks, wherein each block is an 8×8 pixel array; a 16×16 pixel array (luminance) together with an 8×8 pixel block (chrominance) and an 8×8 pixel block (chrominance), comprises a macro block 247; 2) for each of the macro blocks created in step (1), searching the most recent previously occurring frame (which could be either a P- or an I-designated frame, but in the present example is frame 203) for the macro block which contains image information that is most similar to the image information in the macro block created in step (1); 3) generating motion vectors to spatially translate the macro block found in the prior I or P frame in step (2) to the location of the similar macro block in the P frame presently being compressed; 4) generating a predicted frame from the most recent previously occurring frame using the motion vectors; 5) on a macro-block-by-macro-block basis, subtracting the predicted frame from the P-frame being compressed, to generate blocks of residues; 6) performing DCT's on the blocks of residues; 7) quantizing the coefficients of the blocks of transformed residues; and 8) concatenating the quantized residue coefficients and the motion vectors to form a compressed video signal.

In an intra-frame coded (I) picture, every macro block is intra-coded. That is, each macro block is coded without referring to any macro block in the previous I-or P-frame. In the predictive-coded (P) picture, the macro block can be either intra-coded or inter-coded.

To form the coded video bitstream for transmission, the compressed image information, as well as other information such as motion vectors, are coded using specified code words. The code words are then multiplexed into a layered data structure to form the final bitstream. In an H.261-like environment, the coded bitstream is organized into a hierarchical format, the structure of which is illustrated in FIG. 3.

Referring to FIG. 2, the sequence of frames 201, 203, 205, 207, 209, 211, 213, 215, 217, 219, 221 forms a coded video bitstream. This bitstream may be conceptualized as a serial representation of coded frames which can be processed to form a moving video image (i.e., a moving picture). A typical sequence of frames is IPPP. .PIPPP . . . , where I indicates an intra-coded frame, and P designates a predictive-coded frame. For each frame 221, the coded bitstream representing the frame includes a header 263 and coded data 265. Each header 263 includes a start code and data related to the respective frame (i.e., picture). In an H.261 system environment, much of the header information is required for synchronization purposes. For example, at the frame (picture) layer for frame 221, header 263 includes a picture start code (PCS) field 267, a picture number (TR) field 269; a picture type (PTYPE) field 271, a PEI field 273, and a PSPARE field 274. The PEI field 273 and the PSPARE field 274 are adapted to accommodate extra information which may be required for future applications.

Picture data is segmented into Groups of Blocks (GOB) 223, 225, 227, 229, 231, 233, 235, 237, 239, 241, 243, and 245. A GOB (for example, GOB 229) comprises one-twelfth of the coded I-frame (CIF) 221. Therefore, GOB 229 may be conceptualized as including one-third of one quarter of a coded I-frame picture area. The area represented by one-quarter of a coded I-frame picture may be abbreviated as QCIF. Accordingly, there are 12 GOBs 223, 225, 227, 229, 231, 233, 235, 237, 239, 241, 243, 245 in a CIF frame 221, and three GOBs in a QCIF frame. The arrangements of GOBs in a CIF/QCIF picture are depicted in FIGS. 2 and 3.

Each GOB 229 includes a header field 291, followed by a macro block data field 298. The header field 291 includes a GOB start code (GBSC) field 292, a group number (GN) field 293, a group type (GTYPE) field 294, a GOB quantizer (GQUANT) field 295, and spare information fields in the form of GEI field 296 and GSPARE field 297. Each GOB 229 consists of 33 macro blocks, such as "macro block 24 " (reference numeral 247) and "macro block 25 " (reference numeral 249). The arrangement of macro blocks within a GOB is depicted in FIG. 2.

Each macro block includes a header field 275 followed by a block data field 277. The header field 275 includes a macro block address (MBA) field 279, a block type information (MTYPE) field 281, a quantizer type (MQUANT) field 283, a motion vector (MVD) field 285, and a coded block pattern (CBP) field 287. The block data field 277 of each macro block 247 consists of 6 blocks, including four luminance blocks Y1 (reference numeral 251), Y2 (reference numeral 252), Y3 (reference numeral 253), Y4 (reference numeral 254), one chrominance block U (reference numeral 257), and one chrominance block V (reference numeral 259). An illustrative example of the contents of luminance block U (reference numeral 257) is set forth in FIG. 2. Note that this block includes an 8×8 pixel array wherein all pixels have a luminance value of black.

Figure 4:
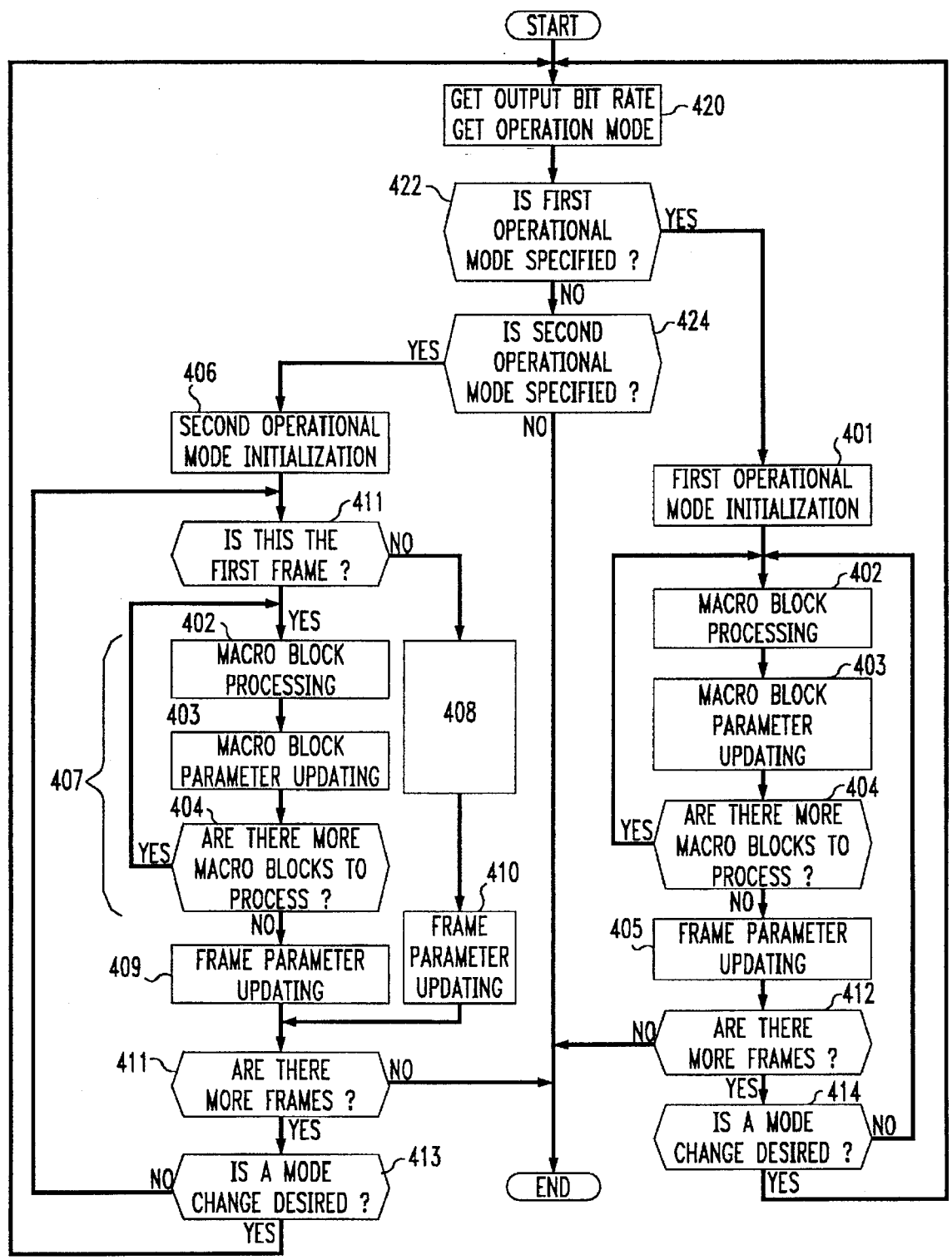
FIG. 4 is a flowchart setting forth a video composition method according to a preferred embodiment disclosed herein.

A block represents a matrix (array) of pixels, e.g., 8×8, over which a discrete cosine transformation (DCT) is performed. The array of pixels is represented by a matrix of pixel array coefficients (AC). The transformed coefficients (TCOEFF) 301 (FIG. 3) consists of DCT coefficients occurring first, followed by respective pixel array coefficients (AC), in the order of their relative importance. The arrangement of DCT and AC coefficients in an illustrative block data field 277 (FIG. 3) is shown in FIG. 4. The block data field 277 (FIG. 3) consists of the transformed coefficients (TCOEFF) 301 and an end of block code (EOB) 303 which is appended at the end of each successively occurring block of data.

Referring back to FIG. 1, the first, second, third, and fourth input signals 101, 102, 103, and 104, respectively, each represent a coded H.261 video bit stream having a transmission rate of R kbits/sec. These input signals are each buffered by a corresponding receiving buffer 105, 106, 107, 108, respectively. Respective video Multiplex Decoders (VMDs) 109, 110, 111, and 112 read the bit streams from the respective buffers and process the video bit streams. VMDs 109, 110, 111, and 112 may be fabricated using a dedicated hardware configuration of a type known to those skilled in the art. Alternatively, digital signal processors (DSPs) may be used to fabricate VMDs 109, 110, 111, and 112, wherein the DSPs are loaded with software which implements the functionality of a VMD. The selection of suitable software for use with the DSPs is a matter well-known to those skilled in the art.

Irrespective of the manner in which VMDs 109, 110, 111 and 112 are implemented, each VMD may be conceptualized as a combination of a decoder and a demultiplexer. When a VMD 109 receives an incoming coded video bit stream, it de-multiplexes the bit stream, decodes any header information which has been coded into the bit stream, and recovers compressed video information, i.e., video data. The output of each VMD 109 consists of three portions: (1) quantized DCT (discrete cosine transformation) coefficients, (2) quantization information, and (3) optional motion vectors.

For VMD 109, a first output 113 provides the DCT coefficients and quantization parameters, and a second output 114 provides the motion vectors, wherein the first and second outputs 113, 114 are obtained from first input signal 101. Similarly, for VMD 110, a first output 115 provides DCT coefficients and quantization parameters, and a second output 116 provides motion vectors, wherein first and second outputs 115, 116 are obtained from second input signal 102. Likewise, VMD 111 has a first output 117 and a second output 118, the first output 117 representing DCT coefficients and quantization parameters, and the second output 118 representing motion vectors, wherein first and second outputs are obtained from third input signal 103. VMD 112 has a first output 119 and a second output 120, first output 119 representing DCT coefficients and quantization parameters, and second output 120 representing motion vectors, wherein first and second outputs 119, 120 are obtained from fourth input signal 104.

The first outputs 113, 115, 117, 119 are coupled to respective DCT processing units 121, 122, 123, and 124. To reduce delay time and computational complexity, motion estimation techniques are not employed. Rather, the motion vectors obtained from second outputs 114, 116, 118, and 120, respectively, are fed directly to first input terminals of respective Video Multiplex Encoders (VME) 129, 130, 131, 132. The VMEs 129, 130, 131, and 132 each perform the function of producing a new video bit stream.

DCT processing units 121, 122, 123, and 124 are the units where the DCT coefficients from first, second, third, and fourth input signals 101, 102, 103, 104 are further processed. The amount of data produced at each DCT processing unit 121, 122, 123, 124 is controlled by respective control signals 143, 144 145, and 146. These control signals are produced by a rate control unit 141.

Each DCT processing unit 121, 122, 123, 124 has a respective output terminal 125, 126, 127, 128. Each output terminal 125, 126, 127, 128 provides a signal which includes processed DCT coefficients, and is coupled to a second input terminal of a respective VME 129, 130, 131, and 132. At each VME 129, 130, 131, 132, the processed DCT coefficients and motion vectors are encoded and multiplexed into the layered structure shown in FIG. 3. The encoded, multiplexed signals produced by VMEs 129, 130, 131, and 132, in the form of coded bit streams, are sent to respective buffers 133, 134, 135, and 136.

The buffers 134, 135, 136, and 137 each include circuitry to ascertain and to indicate buffer status, which is defined as the occupancy ratio of the memory locations within the respective buffer 134, 135, 136, and 137. The occupancy ratio refers to the ratio between the number of occupied memory locations within a given buffer and the total number of memory locations within this buffer. For each buffer 133, 134, 135, 136, the occupancy levels for the various data transfer rates are conveyed to a respective buffer output 137, 138, 139, and 140 in the form of a buffer status indication signal. The buffer status indication signals at buffer outputs 137, 138, 139, and 140 are applied to a rate control unit 141 to adjust the average data rate produced by each DCT coefficients processor 121, 122, 123, and 124.

Rate control unit 141 is coupled to each of the DCT processing units 121, 122, 123, 124. The rate control unit 141 receives the buffer status indication signals from buffer outputs 137, 138, 139, and 140, and computes the number of bits per frame for the video bit streams at the respective buffers 133, 134, 135, 136. This computation yields the total number of bits for each composite CIF frame based on the output transmission rate R. The total number of bits for each composite CIF frame is further distributed among four QCIF pictures, which are represented by the outputs of the four DCT coefficient processors 121, 122, 123, and 124.

The bits allocated to each QCIF picture is distributed to all of the macro blocks in a given frame to determine the targeted number of bits per macro block. Based upon the targeted number of bits per macro block, the rate control unit 141 generates corresponding control signals on signal lines 143, 144, 145, and 146 for the DCT coefficient processors 121, 122, 123, 124. The characteristics of these control signals are selected so as to cause the DCT coefficient processors 121, 122, 123, 124 to minimize or eliminate the difference between the actual number of bits produced for each macro block and the targeted number of bits per macro block to be achieved by a specific DCT processor 121, 122, 123, 124. Note that the targeted number of bits per macro block may, but need not, be the same for each of the DCT processors 121, 122, 123, and 124. DCT processors 121, 122, 123, and 124 receive the DCT coefficients recovered from VMD 109, 110, 111, and 112, and further process these coefficients in order to produce the proper number of coefficients designated by the respective; control signals.

These are the methods which can be used to process the DCT coefficients to reduce the total number of bits under control of rate control unit 141. Each of these methods provides for the "graceful" degradation of video quality, wherein humanly-perceptible degradation is minimized. The first method is termed DCT coefficients zeroing, the second method is called the requantization of the DCT coefficients, and the third method consists of the combination of the first and second methods. In the first method, DCT coefficients are partitioned into groups based upon the relative importance of the various coefficients. Due to the fact that DCT coefficients are generally organized into two-dimensional arrays wherein the array entries which are relatively close to the upper left-hand corner of the array include relatively low-frequency components, as compared with array entries which are relatively close to the lower right-hand corner of the array, the relative importance of various DCT coefficients is known. The lower frequency components are more important and the higher frequency components are less important. Based upon the output produced by rate control 141 circuit on signal lines 143, 144, 145, and 146, the coefficients of the least important group of each DCT coefficient processor are set to zeroes. Here, the control signal on signal line 143, 144, 145 and 146 consist of a digital representation of the indices of a plurality of specific importance groups, or simply indices of the DCT coefficients within a macro block, whose coefficients will subsequently be set to zeroes. By forcing some DCT coefficients to zero, the amount of data produced by the DCT coefficients processor 107 can be properly controlled by rate control 141 circuit.

Figure 10:
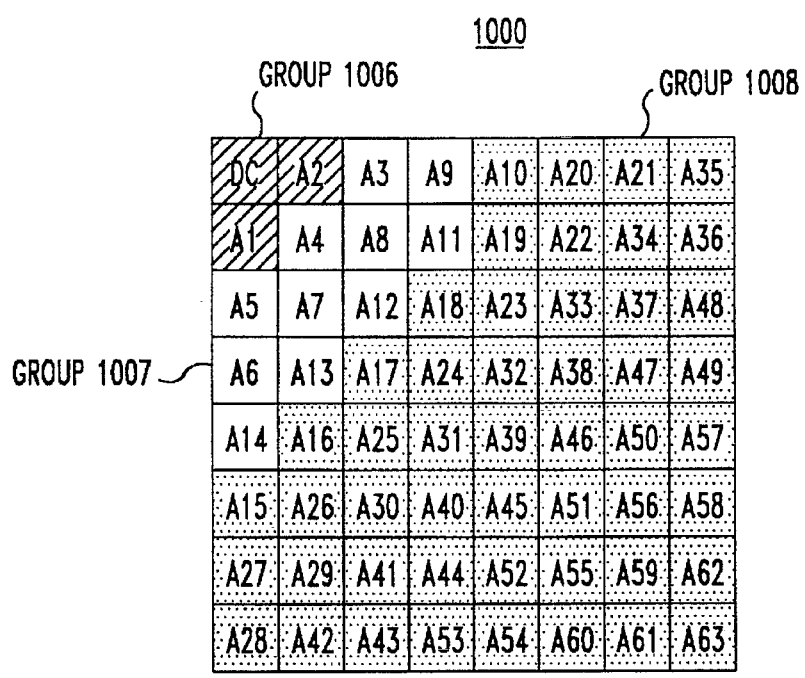
FIG. 10 is a data structure diagram setting forth an illustrative example of DCT coefficient partitioning.

A typical partitioning of DCT coefficients is illustrated in FIG. 10. The DCT coefficients are arranged in a two-dimensional array 1000 stored in block data field 277 (FIG. 3). The two-dimensional array 1000 (FIG. 5) includes eight rows and eight columns. Each entry in the array corresponds to a specific entry group, such as Group 1006, Group 1007, or Group 1008. The groups are based upon the relative importance of the entries contained therein. Each group includes entries conforming to a specific range of importance levels. These importance levels relate to the relative extent to which the elimination of a particular entry would degrade the quality of the overall video image in a given frame. In the example of FIG. 10. Group 1006 is the most important group, and includes entries having a relatively high level of importance. Group 1007 includes entries having an intermediate level of importance, and Group 1008 includes entries having the least importance to the overall quality of the video image.

A second method of processing DCT coefficients is requantization. The output signals at the first outputs 113, 115, 117, 119 of each VMDs 109, 110, 111, 112, includes two components: quantized DCT coefficients, and a quantization parameter. In order to determine values for the DCT coefficients, an inverse quantization operation is performed on the quantized DCT coefficients as follows. Let $\{x^k_i,$ i=0,1,2,. .63, K=1, 2, ,3, 4$\}$ be the quantized DCT coefficients of each DCT coefficients processor K; and $\{Y_i,$ i=0, 1, ... 63$\}$ be the reconstructed DCT coefficients at each DCT coefficients processor K, with $Q^k p$ representing the quantization parameter. Then, with respect to an H.261-like environment, in the I-coding mode, the reconstructed DC coefficient $Y_0$ is calculated using the relationship $$y^k_0 = x^k_0 * 8,$$

and the remaining coefficients are calculated using the formula $y^k_i = [x^k_i * 2 + \sin(x^k_i)] * Q^k p$.

where $\{i=1, 2, \ldots 63\}$ in I mode and $\{i=0, 1, \ldots 63\}$ in P mode, and the sign(w) function is defined as follows:

$$\text{sign}(w) = \begin{cases} 1 & \text{if } w \geq 0 \\ -1 & \text{if } w < 0 \end{cases}$$

To control the amount of data produced by each DCT coefficients processor 121, 122, 123, 124 (FIG. 1), the rate-control unit computes the proper quantization parameters $Q^k p_{new}$ based on the targeted bits per macro block and sends these parameters to DCT coefficients processor 121, 122, 123, 124 to requantize the DCT coefficients. Let $\{z^k_i, i=0,1, \ldots 63, K=1, 2, 3, 4\}$ be the new quantized DCT coefficients, and $Q^k p_{new}$ be the new quantization parameter obtained from the rate control 141 circuit. Then, the new quantized DCT coefficients are determined by $$z^k_0 = (y^k_0 + 4)/8,$$

where $z_0$ is the DC coefficient of the I-coded macro block. The rest of the coefficients are obtained by $$z^k_i = y^k_i / (2 * Q p^k_{new})$$

where $\{i=1, \ldots 63\}$ for the intra-coded macro block, and $\{i=0,1, \ldots, 63\}$ for inter-coded macro blocks, K=1, 2, 3, 4 corresponding to each DCT coefficients processor 121, 122, 123, 124.

A third method of video bit rate matching may be employed in conjunction with a preferred embodiment disclosed herein. This third method includes all methods which represent combinations of various features of the first and second methods. The manner in which the first and second methods are combined is determined by the specific applications of a given system. One illustrative combination of the first and second methods is the process of using DCT coefficient partitioning to process intra-coded macro blocks, and then employing requantization to process the inter-coded macro blocks.

Although the DCT coefficients processor 121, 122, 123, 124 are equipped for implementing the three different processing schemes described above are satisfactory for lower rate reduction and intra-coded frames, there is a mismatch, "drift" between an endpoint device that transmits video information at a fast rate relative to other endpoint devices which decode this video information at a slower rate. This mismatch is brought about because the video encoder is required to operate at a faster bit rate than the video decoder. This mismatch exists for all the inter-coded frames and is likely to accumulate with time, unless an intra-coded frame is periodically inserted into the video bit stream. To control the accumulation of the mismatch, an improved DCT processor with the mismatch correction elements is shown in FIG. 9.

Figure 9:
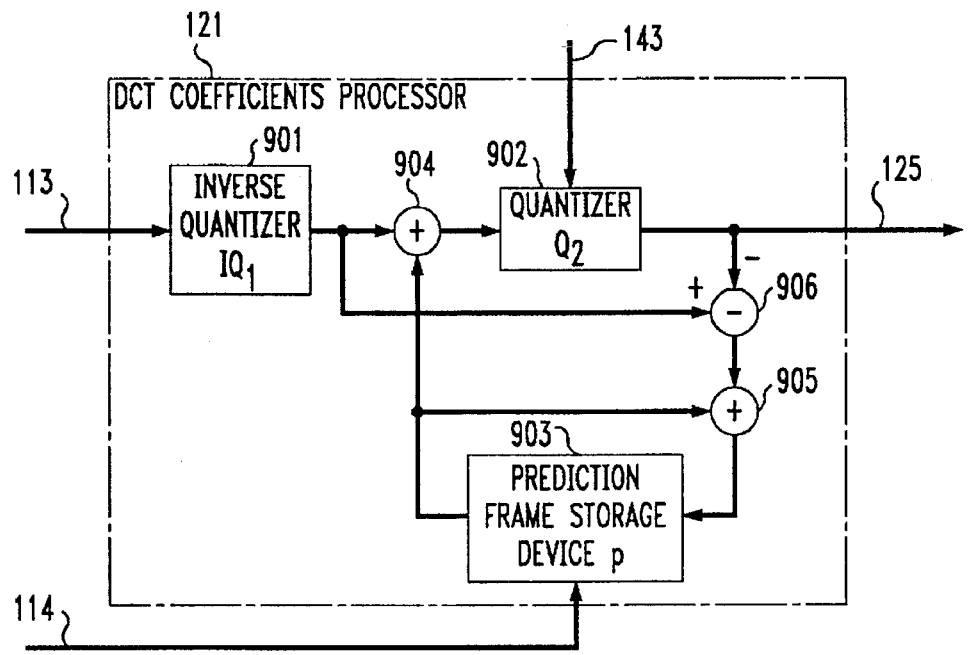
FIG. 9 is a hardware block diagram setting forth an illustrative structure for the discrete cosine transformation (DCT) processor of FIG. 1.

FIG. 9 is a hardware block diagram setting forth an illustrative structure for the discrete cosine transformation (DCT) processor of FIG. 1. The hardware configuration of FIG. 9 represents an improvement over the DCT coefficient processor disclosed before in connection with FIG. 1, as well as other existing state-of-the-art systems, such as the systems described in an ITU-T document entitled, "Low Bitrate Coding (LBC) for Videophone", document no. LBC-94-166. One implementation described in the ITU document utilizes one motion-compensated prediction storage device and two transform operations: a forward transform operation, and an inverse transform operation. The main purpose of this implementation is to correct the "drift", i.e., the mismatch, between a video encoder and a video decoder.

According to a preferred embodiment disclosed herein, the two transform operations described in the preceding paragraph are no longer required. Rather, motion compensation is performed in the transform domain, as the terms "motion compensation" and "transfer domain" are generally understood by those skilled in the art. With reference to FIG. 9, one feature of this embodiment is that the drift error signal stored in a picture memory of a prediction frame storage device 903 need not be stored with full accuracy. In particular, only a small number of the lower-frequency components of the transform coefficients need to be retained in the picture memory. Since only a relatively small number of coefficients are now involved in the motion compensation process, and the transform operations are no longer needed, implementation of the embodiments disclosed herein is simplified considerably over the system described in the above-referenced ITU-T document identified as no. LBC-94-166.

The simplified system disclose;d herein is described below with reference to FIG. 9. An improved DCT (discrete cosine transformation) processor 121 is shown, which includes an inverse quantizer 901, a quantizer 902, and a prediction frame storage device 903. The inverse quantizer 901 accepts an input bit stream from the first output 113 of VMD 109 (FIG. 1). The output of inverse quantizer 901 is coupled to a first input of a summer 904, and this output is also coupled to a first input of a subtractor 906. The output of summer 904 is fed to a first input of quantizer 902. A second input of quantizer 902 is connected to signal line 143 which is coupled to rate control 141 circuit (FIG. 1 ).

The output of quantizer 902 (FIG. 9) is fed to a second input of subtractor 906. The output of subtractor 906 is connected to a first input of summer 905. The output of summer 905 is coupled to a first input of prediction frame memory storage device 903, and a second input of prediction frame memory storage device 903 is connected to the second output of VMD 109 (FIG. 1). The output of prediction frame storage device 903 is fed to a second input of summer 904 and this output is also fed to a second input of summer 905.

Inverse quantizer 901, quantizer 902, summers 904, 905, and subtractor 906 are system components which are well-known to those skilled in the art. Conventional components may be used for these items. With respect to the prediction frame storage device 903, this device includes a video buffer for storing information corresponding to one or more video frames, a random-access memory device, and a microprocessor for controlling the operation of the buffer and the random-access memory. The microprocessor is equipped to execute a software program adapted to perform the steps outlined below in connection with the prediction frame storage device 903.

The hardware configuration of FIG. 9 operates as follows. Assume that an input video bit stream having a bit rate of R1 passes from the first output 105 of VMD 109 (FIG. 1) to the input of inverse quantizer 901 (FIG. 9). One purpose of DCT coefficients processor 121 (FIGS. 1 and 9) is to generate an output signal representing transform coefficients. When the DCT coefficients processor 107 is initially started up, there is no drift error between VMD 109 and VME 129 (FIG. 1). Therefore, upon initial stamp, inverse quantizer 901 provides an output signal including transform coefficients, and this signal passes unchanged through summer 904, to quantizer 902.

The operation of quantizer 902 is controlled by a signal on signal line 143 from the rate control 141 circuit (FIG. 1), so as to provide a signal having the desired output bit rate at the output of buffer 133 of FIG. 1. Note that the output of quantizer 902 (FIG. 11) represents the DCT coefficients processor output 125. This output 125 is then recoded and multiplexed with motion vectors and quantization information by VME 129 (FIG. 1). The VME 129 may then send the recoded, multiplexed signal to transmission buffer 133. The signal is stored in buffer 133 prior to synchronization and multiplexing at sync and mux 147 (FIG. 1). The fullness, or buffer memory location occupancy ratio, of transmission buffer 133 is used to control the quantization levels for quantizer 902.

Next, assume that the output of inverse quantizer 901 does not equal the output of quantizer 902. The output of inverse quantizer 901 will be denoted as "A", and the output of quantizer 902 will be denoted as "B". Thus, an error of BA is added to the picture data. This error, denoted as Ed, is subtracted from the picture data by the system of FIG. 9. At initial startup, Ed is zero, and the data pass unchanged through summer 905 to the prediction frame storage device 903. Typically, only a small number of low-frequency coefficients are fed to subtractor 906, and thus, Ed is only an approximation of the actual drift error due to requantization. During recoding of the next video frame, Ed is approximately equal to the drift error of the previous frame. During motion-compensated prediction, prediction frame storage device 903 uses motion vectors on the second output 114 of VMD 109 (FIG. 1) to output a displaced drift error signal, which will be seen at the DCT coefficients processor output 125, and at transmission buffer 133 which receives bits at the desired output bit rate. Without correction, this drift error will accumulate over time and eventually result in unacceptable system performance.

In order to ameliorate the problem of drift error accumulation, the previous frame motion compensated drift error Ed is added to the present frame signal A prior to requantization by quantizer 902. If quantizer 902 introduced very little error, this would completely correct the drift error accumulation problem. However, since quantizer 902 introduces a finite amount of error, the drift can only be partially corrected, and the output of subtractor 906 will not, in general, be zero. Thus, summer 905 adds the drift error from the current frame to the approximate accumulated drift error from previous frames to produce an approximate accumulated drift error Ed for the current frame.

The prediction frame storage device 903 only has to compute a small number (i.e., N) of compensated coefficients. Note that, for intra-blocks of video data, the prediction frame storage device 903 is programmed to set Ed to zero. The relatively small number of computations required to implement the methods disclosed herein is vastly reduced as contrasted with the relatively large number of computations required to perform existing processes using pel domain motion compensation. An additional advantage of the disclosed methods is that these methods require much less memory space than existing prior art methods.

As mentioned previously, rate control unit 141 generates four control signals 143, 144, 145, and 146, which serve the purpose of controlling the amount of data produced by each DCT processor 121, 122, 123, 124. Therefore, if a control signal is changed, the composite output video bit stream may also change. If the input video bits R1, R2, R3, R4 are different, the rate control unit could generate the different control signals to control each DCT coefficients processor 121, 122, 123, 124 to produce the proper composite output. For illustrative purposes, two operational modes may be defined. In a first operational mode, according to each input rate R1, R2, R3, R4 and the required output rate R, rate control unit 141 allocates the proper amount of bandwidth to each DCT coefficients processor 121, 122, 123 and 124. In a special case, where the input rates are the same, i.e., R1=R2=R3=R4=R, then the rate control unit 141 allocates an equal amount of bandwidth to each DCT processor 121, 122, 123, 124. In this case, the control signals applied to signal lines 143, 144, 145, and 146 are identical. Therefore, the total number of bits generated by each DCT processor 121, 122, 123, and 124 are identical or very close. The frame rates and the picture quality of each quarter (QCIF) in the final composite picture (CIF) are the same.

In a second operational mode, the input video rates R1=R2=R3=R4=R and at least one of the DCT processors 121 is allocated with a first amount of bandwidth, and at least one of the remaining DCT processors 122, 123, 124 is allocated with a second amount of bandwidth, such that the first amount of bandwidth does not equal the second amount of bandwidth. This mode is particularly useful in the operational environment of a conference wherein some participants desire to transmit video data consisting of still images, such as drawings or figures, as opposed to moving images.

As there is no need to allocate a large amount of bandwidth to input signals representing still video images, rate control unit 141 allocates less bandwidth to these inputs, while at the same time allocating more bandwidth to those input signals which carry bit streams of moving video images. The operational modes may be selected by one of the conference participants (i.e., "chair control") and fed from a given endpoint device to the rate control unit 141 via a signal received on signal line 142 from control processor 840.

FIG. 4 is a flowchart setting forth control procedures for the two operational modes discussed in the preceding paragraph. The program commences at block 401, where the rate control unit 141 (FIG. 1) obtains the output bit rate and the desired operational mode or modes from the host control unit via a signal on signal line 142. Also at block 401, the rate control unit 114 (FIG. 1) implements a series of operations which are determined by the operational mode(s) specified by the host control unit. For example, let R_out1, R_out2, R_out3, and R_out4 be the targeted bit rates for four processed video bit streams having F_out1, F_out2, F_out3, and F_out4 as the targeted frame rates of these video bit streams. Note that these bit streams are in the form of four processed QCIF video bit streams. If the first operational mode described above is selected, then at the initialization stage indicated at block 401, rate control unit 141 performs the following steps:

(1) Specifying the targeted bit rates for the four processed video bit streams, wherein R_out1=R_out2=R_out3 =R_out4 =R/4;

(2) According to R/4, determining the maximum output frame rates, F_out1, F_out2, F_out3, and F_out4. Here F_out1 =F_out2 =F_out3 =F_out4 =F_out;

(3) Sending F_out1, F_out2, F_out3, and F_out4 to the corresponding endpoint devices via signal line 142 to force these endpoint devices to operate with the specified maximum frame rates;

(4) Computing the average bits_per_QCIF frame. Use the equation:

$$\text{average bits\_per\_QCIF frame} = \frac{R}{4 * F\_out}.$$

(5) Initializing the four output buffers with initial buffer fullness (memory location occupancy rate) of B_0/4;

(6) Specifying the targeted bits__per__QCIF frame for the 1st frame of the video inputs:

$$\text{targeted-bits-per-}QCIF = K * \left( \frac{R}{4 * F\_out} \right)$$

where K is a constant which is chosen based on the maximum frame rate and the initial buffer fullness B__0/4;

(7) Calculating the targeted number of bits per macro block: targeted bits__per__mblk=(targeted bits__per__frame)(total__number__of__mblk); and (8) According to the targeted bits__per__mblk, specifying control signals at signal lines 143, 144, 145, and 146, respectively.

At macro block processing stage 402, the DCT coefficient processors 121, 122, 123, and 124 perform the following steps:

(1) Obtaining a macro block from first outputs 113, 115, 117, and 119 (FIG. 1), respectively;

(2) Obtaining the control signals on buffer outputs 143, 144, 145, and 146 from the rate control unit 141;

(3) Processing DCT coefficients in accordance with the control signals obtained in step (2); (Note that, if the DCT zeroing method is used in DCT coefficients processor P, then control ;signals will be the coefficients size or else, if the requantization scheme is used, the control signal will be the quantification parameter.

Next, at block 403, alter the processing of one macro block has been completed, rate control unit 141 gets the new status for each buffer by obtaining the control signals on buffer outputs 143, 144, 145, and 146. Based upon these outputs, the rate control unit 141 updates the control signals. The steps for performing this update include:

(1) Obtaining the total number of bits used in a given macro block from each buffer, which may be specified as bits__per__mblk;

(2) Computing the difference between the targeted number of bits__per__mblk and the actual bits__per__mblk for each of the DCT processors;
bits__difference +=targeted bits__per__mblk—bits__per__mblk;

(3) Updating the control signals at rate control unit 141, of signal lines 143, 144, 145, 146, at buffer outputs 143, 144, 145, and 146, based on the following:

If difference >0, adjusts the control signal to allow the corresponding DCT processor to process DCT coefficients in such a way that more bits will be produced at the buffer output;

else if difference <0, adjust the control signal to allow the corresponding DCT processing unit to process DCT coefficients in a way that less bits will be produced at the buffer output;

else no change in control signals.

At the end of processing each macro block, the macro block counter is checked against the total number of macro blocks to ascertain whether or not a frame is finished. If a frame is finished, rate control unit 141 starts updating the frame parameters. At block 405, the rate control unit 141 performs the following steps:

(1) Obtaining the buffer status for each buffer;

(2) Obtaining the total number of bits used by each QCIF frame; (Note that the number of bits used by the composite CIF frame will be the sum total of the number of bits used by each of the four QCIF frames);

(3) Based on the targeted buffer fullness, computing the targeted number of bits for the next composite CIF frame; (the bits for each QCIF frame is equal to the targeted number of bits for the next composite CIF frame divided by four), and the bits per macro block in each QCIF frame will be:
bits__per__macroblock =bits__per__CIF frame/ (4*total__number__of__mblk); and (4) Based on the targeted number of bits for each macro block, determining the characteristics of the control signals for the first macro block of the next frame.

After frame parameter updating, the DCT processors are ready to process the next frame. If there are no more bits in the receiving buffers, then the procedure of FIG. 4 ends. Otherwise, the rate control unit 141 obtains a signal specifying an operational mode from signal line 142. If the operational mode has been changed from the mode previously specified, then the entire procedure described in FIG. 4 recommences at block 401; otherwise, the program reverts back to macro block processing at block 402.

In the case where the second operational mode referred to above is specified, rate control unit 141 performs different procedures than those described in connection with the first operational mode. These different procedures will be described below. For purposes of illustration, assume that input signal 101 carries the full-motion video of a conference speaker, and input signals 102, 103, and 104 each carry video information corresponding to still images. Then, with reference to the procedures described in FIG. 4, rate control unit 141 performs the following steps at the initialization stage of block 406:

(1) Based on R/4, specifying the maximum frame rate F__out2, F__out3, and F__out4;
$F_{out2}=F_{out3}=F_{out4}$, etc., $=F_{out}$;

(2) Based on R, specifying the maximum frame rate, F__out1;

(3) Sending the frame rate $F_{out1}$, $F_{out2}$, $F_{out3}$, and $F_{out4}$ to the corresponding endpoint devices via a signal on signal line 142 to force these endpoint devices to operate using the specified maximum frame rates;

(4) Initializing the buffer 133 with the initial buffer fullness $B_1$;

(5) Computing the targeted bits of the first frame for the processed input signals 102, 103, and 104;

$$\text{targeted bits\_per\_frame} = K * \left( \frac{R}{4 * F_{out2}} \right)$$

where K is a constant which is chosen based on the maximum frame rate F__out; then the targeted bits__per__mblk is equation targeted bits__per__mblk= targeted bits__per__frame total__number__of__mblk;

(6) According to the targeted bits__per__mblk, specifying the characteristics of control signals 144, 145, and 146;

(7) Computing the targeted bits of the 1st frame for the processed input 101:

$$\text{targeted bits\_per\_frame} = K * \left( \frac{R}{F_{out1}} \right),$$

where K is a constant which is chosen based on the maximum frame rate F__out1 and the initial buffer fullness $B_1$ Then the targeted bits__per__mblk is targeted bits__per__mblk=(targeted bits__per__frame) (total__number__of__mblk);

(8) According to the targeted bits_per_mblk, specifying the characteristics of control signal 143.

After the macro block processing stage, the DCT coefficient processors perform the procedures set forth in block 407 or, alternatively, the procedures set forth in block 408. The selection of whether to perform the procedures of block 407 or the procedures of block 408 depends upon whether the current frame is the first frame. If so, block 407 is performed; if not, block 408 is performed. The procedure of block 407 consists of performing the steps set forth in blocks 402, 403, and 404. After finishing the first frame, rate control unit 141 starts updating the frame parameter at block 409. Rate control unit 141 performs the following steps at block 409:

(1) Obtaining the buffer status at buffer output 137;

(2) Obtaining the total bits used by each QCIF frame (note that the total number of bits used by the composite CIF frame will be the sum of the number of bits used by the four QCIF frames);

(3) Based on the buffer status at buffer output 137 and the number of bits used by the first composite CIF frame, computing the targeted number of bits for the next composite CIF frame;

(4) Allocating the number of bits to be used by each QCIF frame; here the bits for the QCIF for input signal 101 is:

targeted bits_per_frame=(targeted bits_next_CIF)—(3*GOB_header_bits); then, the targeted bits for each macro block in 101 QCIF frame is targeted bits_per_mblk=(targeted bits_per_frame) (total_number mblk);

(5) Based on the targeted bits for each macro block, determining the characteristics of the control signal on signal line 143;

(6) Setting the control signals on signal lines 144, 145, and 146 to clear all the DCT coefficients obtained from outputs 115, 117, and 119. Set signals on outputs 138, 139, and 140 to clear buffers 134, 135, and 136.

Referring again to FIG. 4, when the current frame is not the first frame, the DCT coefficient processors execute the steps in block 408. At block 408, DCT processing unit 121 executes the steps previously enumerated at blocks 402, 403, and 404, and DCT processing units 122, 123, and 124 perform the following steps:

(1) obtaining the control signals 144, 145, and 146;

(2) setting all the incoming DCT coefficients to zero;

(3) cleaning buffers 134, 135, and 136 via 138, 139, and 140;

(4) performing the steps previously enumerated at block 404.

After finishing one frame, rate control unit 141 starts updating the frame parameters at block 410. The steps in block 410 include:

(1) Obtaining the buffer status at buffer output 137;

(2) Obtaining the total number of bits used by the QCIF frame corresponding to input signal 101;

(3) Calculating the number of bits used by the composite CIF frame, which is determined by adding the number of bits used by the QCIF frame corresponding to input signal 101, to the number of bits used by three GOB headers;

(4) Based on the buffer status at buffer output 137 and the targeted buffer fullness, computing the targeted bits for the next composite CIF frame; note that the targeted number of bits to be used in the QCIF corresponding to input signal 101 is given by:

targeted bits_per_frame=targeted bits_next_CIF—3*GOB_header_bits; then the targeted bits for each macro block in 101 QCIF frame is targeted bits_per_mblk=(targeted bits_per_frame) (total_number_of_mblk);

(5) Based on the targeted number of bits for each macro block, generate an appropriate signal for control signal 143.

After frame parameter updating, the DCT processors are ready for a new frame. If there are no data in the buffers, the procedure ends. Otherwise, the rate control unit 141 obtains the operational mode from signal line 142. If the operational mode is unchanged, restart the whole procedure from block 401; otherwise, go back to block 411.

Synchronization and multiplex unit 147 accepts four processed input bit streams from buffer outputs 133, 134, 135, and 136. The synchronization and multiplexer unit 147 then synchronizes and multiplexes these bit streams to form a new composite video bit stream 150. The detailed block diagram and the corresponding relationship between the buffer outputs 133, 134, 135, and 136 and the output 150 of multiplexer are depicted in FIG. 5.

Figure 5:
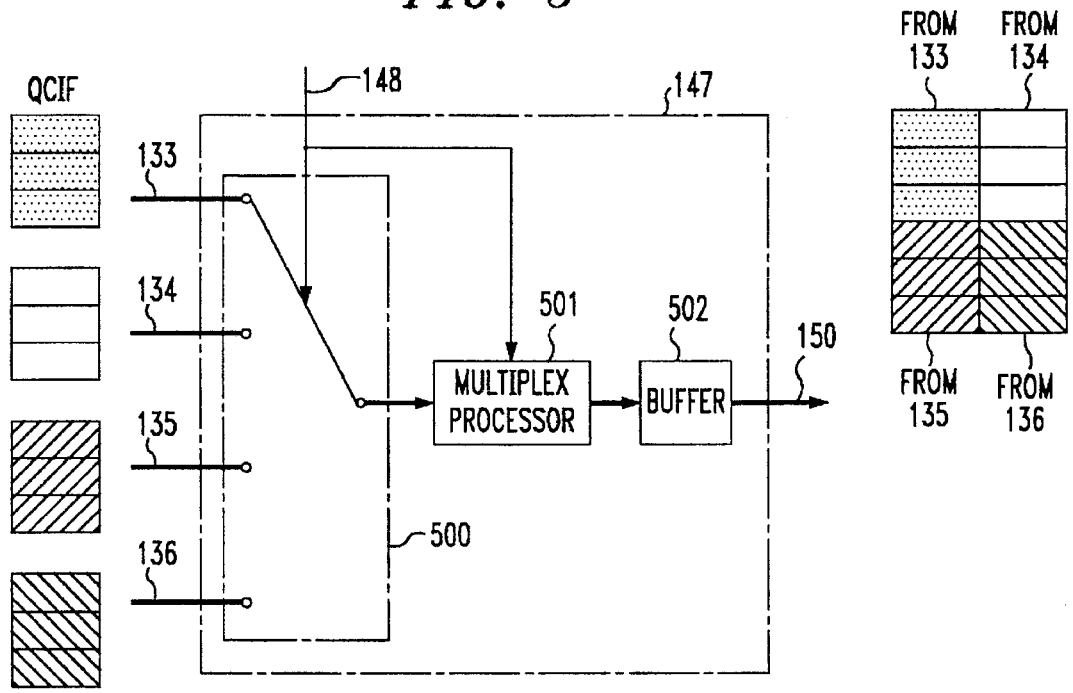
FIG. 5 is a hardware block diagram of a synchronization and multiplexing unit.

Referring to FIG. 5, the synchronization and multiplexer unit 147 consists of a switcher 500, a multiplexer processor 501, and a buffer 502. A control signal on signal line 148 controls the operation of switcher 500, such that the switcher switches to a first input buffer at a first moment in time, and switches to a second input buffer at a second moment in time. This signal line is coupled to an endpoint device which includes user interface means for entering the desired operational mode (the term "operational mode " was defined above). The multiplexer processor 501 processes the input data based on the operational mode obtained via signal line 148 and then sends the processed data to the buffer 502.

Figure 6:
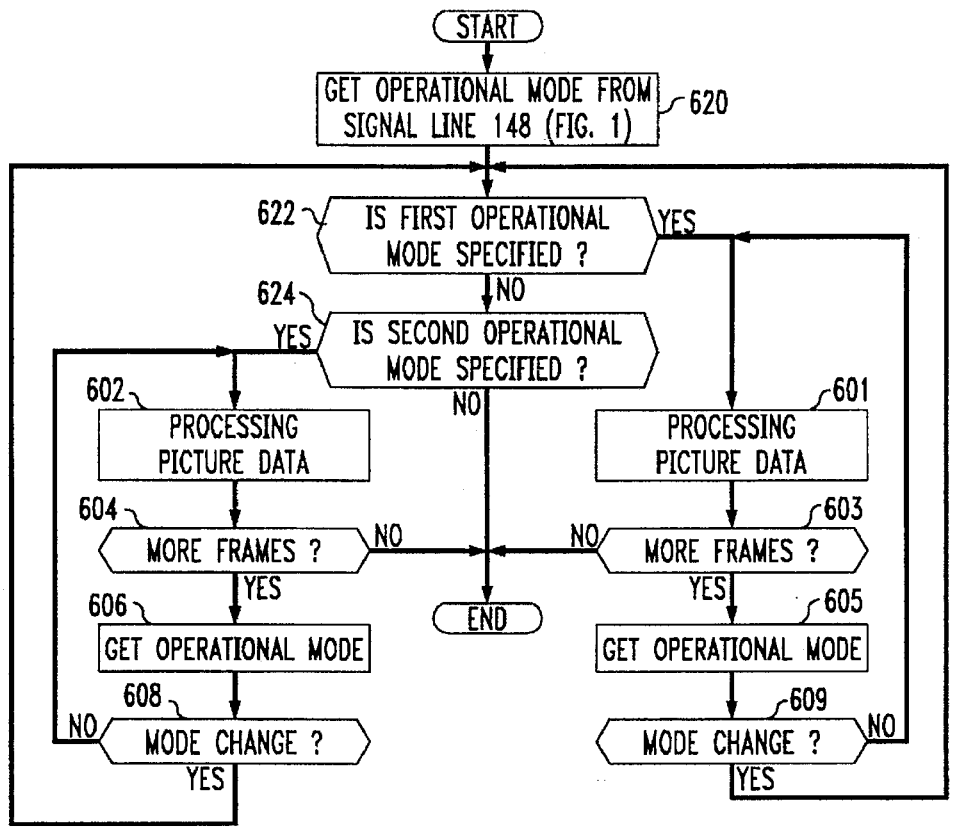
FIG. 6 is a flowchart setting forth the synchronization and multiplexing procedure used by the system of FIG. 5.

FIG. 6 is a flowchart setting forth a procedure executed by the synchronization and multiplexer unit 147 of FIG. 5. In FIG. 6, if the first operational mode (as defined above) is used, the multiplexer processor 501 (FIG. 5) processes the input data based on the steps set forth in block 601. If the second operational mode is used, the multiplexer processor 501 processes the input data based on the steps set forth in block 602.

The steps performed at block 601 include:

(1) Uploading the data of the first GOB from buffer output 133;

(2) Downloading the data of step (1) to buffer 502 (FIG. 5);

(3) Uploading the data of the first GOB from buffer output 134;

(4) Resetting GN=2;

(5) Downloading the data of Step (3) as modified by Step (4) to buffer 502;

(6) Uploading the data of the second GOB from buffer output 133;

(7) Downloading the data of step (6) to buffer 502;

(8) Uploading the data of the second GOB from buffer output 134;

(9) Resetting GN=4;

(10) Downloading the data of steps (8) and (9) to buffer 502;

(11) Uploading the data of the third GOB from buffer output 133;

(12) Downloading the data of step 11 to buffer 502;

(13) Uploading the data of the third GOB from buffer output 134;

(14) Resetting GN=6;

(15) Downloading the data of steps 13 & 14 to buffer 502;

(16) Uploading the data of the first GOB from buffer output 135;

(17) Resetting GN=7;

(18) Downloading the data of steps 16 & 17 to buffer 502;

(19) Uploading the data of the first GOB from buffer output 136;

(20) Resetting GN=8;

(21) Downloading the data of steps 19 & 20 to buffer 502;

(22) Uploading the data of the second GOB from buffer output 135;

(23) Resetting GN=9;

(24) Downloading the data of steps 22 & 23 to buffer 502;

(25) Uploading the data of the second GOB from buffer output 136;

(26) Resetting GN=10;

(27) Downloading the data of steps 25 & 26 to buffer 502;

(28) Uploading the data of the third GOB from buffer output 135;

(29) Resetting GN=11;

(30) Downloading the data of steps 28 & 29 to buffer 502;

(31) Uploading the data of the third GOB from buffer output 136;

(32) Resetting GN=12;

(33) Downloading the data of steps 31 & 32 to buffer 502.

After block 601 is executed, the program progresses to block 602. The steps in block 602 include:

(1) If the input data represents the first frame of video, execute the procedure of block 601; otherwise execute the following:

(2) Upload the data of the first GOB from buffer output 133 and download the data to buffer 502;

(3) Generate the GOB header: with GN=2, and download the data to buffer 502;

(4) Upload the data of the second GOB from buffer output 133 and download the data to buffer 502;

(5) Generate the GOB header with GN=4, and download the data to buffer 502;

(6) Upload the data of the third GOB from buffer output 133 and download the data to buffer 502;

(7) Generate GOB headers with GN=6, 7, 8, 9, 10, 11, and 12, respectively, and download the data to buffer 502.

Figure 7:
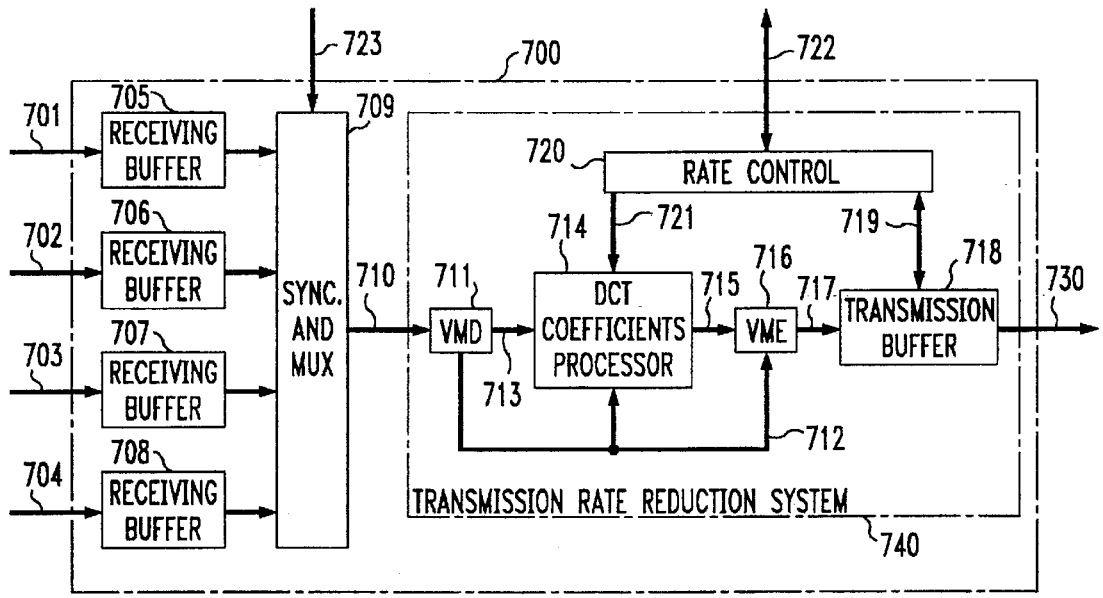
FIG. 7 is a hardware block diagram setting forth a video composition system constructed in accordance with a preferred embodiment disclosed herein.

FIG. 7 is a hardware block diagram setting forth an alternative embodiment of a video composition system. The system provides first, second, third, and fourth inputs 701, 702, 703, and 704 which accept input signals in the form of coded video bit streams, similar to the input signals described in conjunction with FIG. 1. The output signal at output 710 is a coded video bit stream having a bit rate of R kbits/s. Signals at first, second, third, and fourth inputs 701, 702, 703, 704 are buffered using respective buffers 705, 706, 707, and 708, and then fed to a synchronization and multiplexer unit 709. At the synchronization and multiplexer unit 709, the signals at the first, second, third, and fourth inputs 701, 702, 703, and 704 are combined into one output signal at output 710. The manner in which these signals are combined is determined by an operational mode signal on signal line 723. This signal specifies a desired operational mode for the synchronization and multiplexer unit 709. For example, this signal may specify an operational mode wherein the four inputs 701, 702, 703, 704 are combined in equal portions to form one output signal at output 710. The Four inputs 701, 702, 703, 704 are each in a QCIF format. The signal at output 710 is in a CIF format which includes a composite of the four QCIF inputs with transmission rate of R1, +R2, +R3+R4 kbits/s. To match the output transmission rate, which is R kbits/s, the signal at output 710 is sent to a video transmission rate reduction system 740. The video transmission rate reduction system 740 includes a Video Multiplex Decoder (VMD) 711, a DCT coefficient processor 714, a Video Multiplex Encoder (VME) 716, a transmission buffer 718, and a rate control unit 720. The detailed functionality and the operation of the video transmission rate reduction system 740 is disclosed in the previously-cited patent application filed on the same date as the present patent application by the identically-named inventors and document entitled, "Video Transmission Rate Matching for Multimedia Communications Systems ".

The synchronization and multiplexer unit 709 is virtually identical to that described in conjunction with reference numeral 147 of FIG. 1, with the exception that control signal 148 is replaced by data uploaded from buffers 705, 706, 707, and 708.

The video composition systems shown in FIGS. 1 and 7 can be implemented, for example, by using a general-purpose microprocessor, a digital signal processor (such as an AT&T DSP 3210 or an AT&T DSP 1610), and/or a programmable video processing chip (such as an integrated circuit known to those skilled in the art as the ITT VCP chip).

Multimedia System Using Video Processing of the Present Invention

Figure 8:
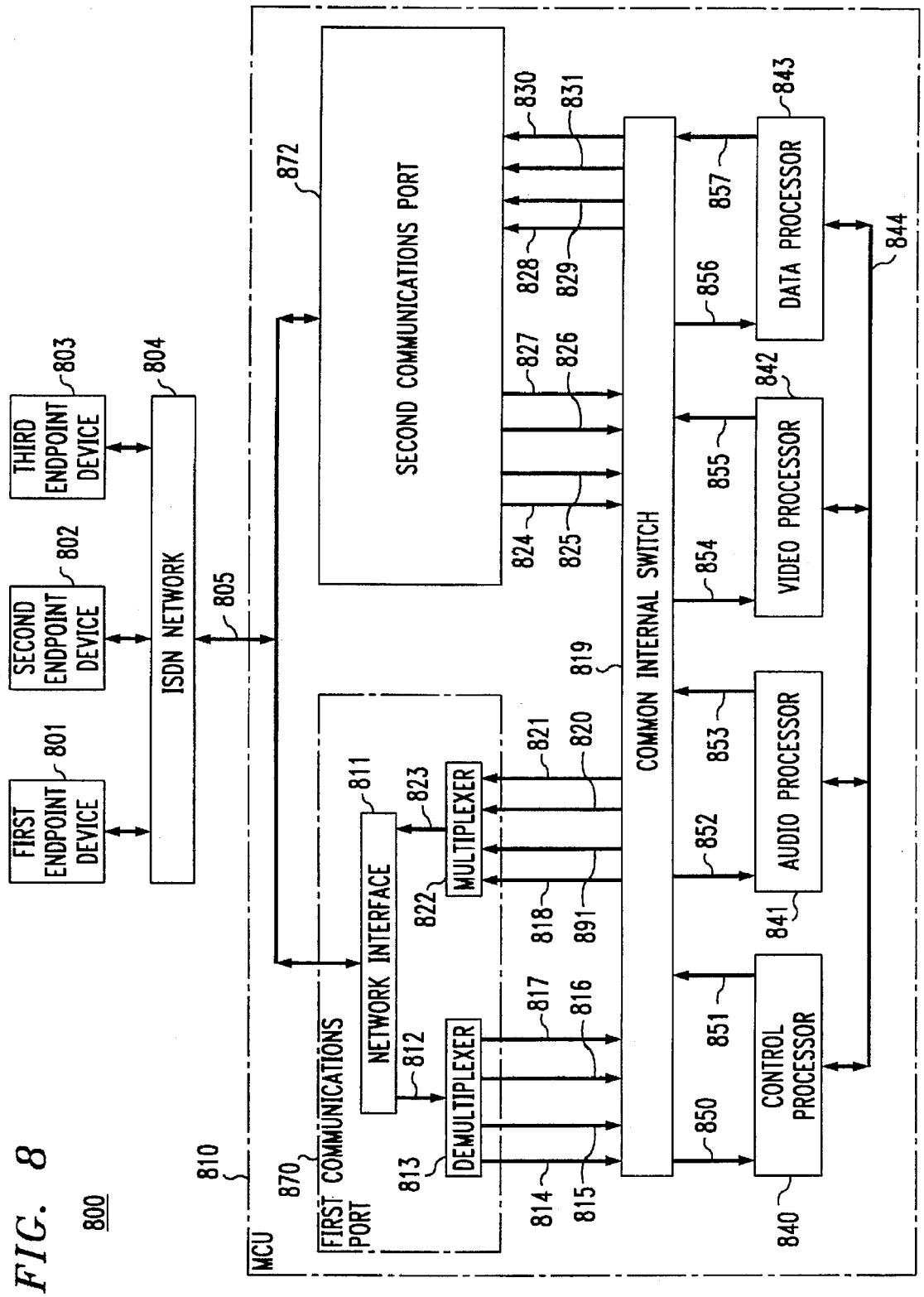
FIG. 8 is a block diagram showing an illustrative hardware configuration for the video processor of FIG. 7.

To illustrate various typical applications for the present invention in the context of multimedia conferencing, FIG. 8 shows a multimedia system using a video processor embodying the coded domain video composition techniques disclosed herein. Referring now to FIG. 8, a block diagram setting forth the system architecture of a multimedia conferencing system 800 is shown. The conferencing system includes an MCU 810, an ISDN network 804, and a plurality of endpoint devices such as first endpoint device 801, second endpoint device 802, and third endpoint device 803.

Endpoint devices 801, 802, and 803 are coupled to MCU 810 via ISDN network 804. These endpoint devices 801, 802, and 803 may include one or more user interface devices. Each interface device includes either an input means, an output means, or an input means combined with an output means. Output means are adapted to convert multimedia electronic signals representing audio, video, or data into actual audio, video, or data. Input means are adapted to accept audio, video, and/or data inputs, and to convert these inputs into electronic signals representing audio, video, and/or data. Examples of user interface devices include video display, keyboards, microphones;, speakers, and video cameras, or the like.

Endpoint devices 801, 802, and 803 are adapted to communicate using existing multimedia communication protocols such as ISDN. The endpoint device multimedia communication protocol controls the presentation of media streams (electronic signals representing audio, video, and/or data information) to the endpoint device user. Endpoint devices may function bi-directionally, both sending and receiving multimedia information, or, alternatively, endpoint devices may function uni-directional, receiving but not sending multimedia information, or sending but not receiving multimedia information.

An example of a suitable endpoint device is an ITU-T H.320 audiovisual terminal, but any device capable of terminating a digital multimedia stream and presenting it to the user constitutes, an endpoint device. A particular product example of an H.320-compatible endpoint is the AT&T-GIS Vistium.

MCU 810 is a computer-controlled device which includes a multiplicity of communications ports, such as first communications port 870 and second communications port 872, which may be selectively interconnected in a variety of ways to provide communication among a group of endpoint devices 801, 802, 803. Although the system of FIG. 8 shows two communications ports, this is done for illustrative purposes, as any convenient number of communications ports may be employed. MCU 810 also includes a control processor 840, an audio processor 841, a video processor 842, a data processor 843, and a common internal switch 819. Each communications port includes a network interface, a demultiplexer, and a multiplexer. For example, first communications port 870 includes network interface 811, demultiplexer 813, and multiplexer 822.

Although MCU 810 is shown with two communications ports 870, 872 for purposes of illustration, MCU 810 may, in fact, include any convenient number of communications ports. For an MCU 810 having N ports, there are N network interfaces, one control processor, one audio processor, one video processor, and one data processor. For each processor, there are N input signals coming from N demultiplexers and N output signals going to the N multiplexers. Therefore, MCU 810 may be conceptualized as an N-port MCU where only two communications ports 870, 872 are explicitly shown.

As shown in FIG. 8, first communications port 870 includes network interface 811, demultiplexer 813, and multiplexer 812. Network interface 811 is a circuit which provides the conversion function between the standard line signal coding used by ISDN network 804 and the P×64 kbps H.221 signal used by MCU 810. Network interface 811 includes output port 812, which is adapted to provide an output in the form of an H.221 signal. The H.221 signal is actually a multiplex of several different types of information (audio, video, data, control); therefore, network interface 811 must send the incoming MCU H.221 signal to a demultiplexing device such as demultiplexer 813. Likewise, network interface 811 has an input port 823 adapted to receive an H.221 signal from multiplexer 822. Multiplexer 822 combines a plurality of individually-processed signals which are to be transmitted to a particular endpoint device.

Demultiplexer 813 separates an incoming multimedia signal stream received from network interface 811 into four components: a first component 814, comprising electronic signals representing control; a second component 815, comprising electronic signals representing audio; a third component 816, comprising electronic signals representing video; and a fourth component 817, representing data. The first, second, third, and fourth components 814, 815, 816, 817 represent outputs of demultiplexer 813 which are coupled to common internal switch 819.

Multiplexer 822 accepts a plurality of incoming multimedia signal components from common internal switch 819, such as a first component 818 representing control, a second component 891 representing audio, a third component 820 representing video, and a fourth component 821 representing data. The multiplexer 822 integrates the first, second, third, and fourth components 818, 891, 820, 821 onto a single multimedia signal stream which is coupled to network interface 811. This single multimedia signal stream may be conceptualized as the output of multiplexer 822. The network interface 811 routes this multimedia signal stream to a specific endpoint device 801, 802, 803. For second communications port 872, the four output components are first component 824, representing control, second component 825, representing audio, third component 826, representing video, and fourth component 827, representing data. The four input components to multiplexer in second communications port 872 are first component 828, representing control, second component 829, representing audio, third component 830, representing video, and fourth component 831, representing data.

Common internal switch 819 contains a plurality of electronic switches, buffers, and/or amplifiers under the control of control processor 840. Common internal switch 819 is coupled to audio processor 841 for mixing and switching electronic signals representing audio; common internal switch 819 is also coupled to video processor 842 and data processor 843 for mixing and switching electronic signals representing video and data, respectively. Therefore, common internal switch 819 effectively receives four output components from each communications port 870, 872 and routes these output components to selected ones of respective processors (control processor 840, audio processor 841, video processor 842, and/or data processor 843) within MCU 810. Likewise, common internal switch 819 receives the output components of each processor in MCU 810 and routes these outputs to the multiplexer 822 of each communications port 870.

Common internal switch 819 receives output control signals from control processor 840 over signal line 851, and provides input control signals to control processor 840 over signal line 850. Common internal switch 819 receives output audio signals from audio processor 841 over signal line 853, and provides input audio signals to audio processor 841 over signal line 852. Common internal switch 819 receives output video signals from video processor 842 over signal line 855, and provides input video signals to video processor 842 over signal line 854. Common internal switch 819 receives output data signals from data processor 843 over signal line 857, and provides input data signals to data processor 843 over signal line 856. Control processor 840 provides control signals to the audio processor 841, video processor 842, and data processor 843 over signal line 844.

ISDN network 804 is connected to MCU 810 over signal line 805. Within MCU 810, signal line 805 is parallel-connected to first and second communications ports 870, 872. For example, in the case of first communications port 870, signal line 805 is connected to network interface 811. Network interface 811 is coupled to demultiplexer 813 over signal line 812, and this network interface 811 is also coupled to multiplexer 822 over signal line 823. Signal line 812 is coupled to the input terminal of demultiplexer 813, and signal line 823 is coupled to the output terminal of multiplexer 822.

Audio processor 841 includes software and hardware for processing audio signals. The processing may take the form of switching the audio, mixing the audio, or both. In the case of audio mixing, the input signal to audio processor 841 is an aggregate audio signal consisting of the audio output signals from all of the communications ports 870, 872 of MCU 810. For an N-port MCU 810, this signal includes the N audio signals from the demultiplexers within each communications port 870, 872.

To mix the audio, audio processor 841 decodes each of the audio inputs, linearly adds the signals obtained by decoding, and then re-encodes the linear sum. For each endpoint device, this linear sum may be subjected to additional processing steps, so as to provide each endpoint device with audio information specific to that endpoint device. These additional processing steps may include, for example, any of the following: the output sum for a given endpoint device may exclude that endpoint's input; the sum may include inputs whose present or recent past values exceed a certain threshold; or the sum may be controlled from a specially-designated endpoint device used by a person termed the "chair", thereby providing a feature generally known as chair-control. Therefore, the output of the audio processor 841 is in the form of N processed audio signals.

In the case of audio switching, the input signal to audio processor 841 is a single audio signal which is selected from a given communications port 870 or 872, based upon control signals received from control processor 840. No audio processing is implemented in the present example which involves only audio switching. The audio input is broadcast to all other audio processor 841 outputs, either automatically or under manual control.

Data processor 843 includes hardware and software means for implementing one or both of the functions generally known to those skilled in the art as "broadcast" or "MLP". For each type of broadcast data, data input is accepted from only one endpoint device at any one time. Therefore, the input signal to data processor 843 is the data output from one of the communications ports 870, 872. This data output is broadcast to the other endpoint devices as determined by control processor 840, according to the capabilities of specific endpoint devices to receive such data, as set forth in the capability codes stored in memory units (RAM or ROM) of respective endpoint devices. For the endpoints which are selected for picture composition, control processing unit 840 modifies their capability codes by specifying a new maximum frame rate based on the output transmission rate of the communication link, and send the new capability codes to the four selected endpoints so they can produce video bitstreams with proper maximum frame rate. If there are no special requirements received from any of the endpoint devices, the control processor 840 sets the operation mode to mode 1 (the first mode).

Control processor 840 is responsible for determining the correct routing, mixing, switching, format and timing of the audio, video, data and control signals throughout a multimedia conference. The control processor 840 retrieves one or more capability codes from each endpoint device. Capability codes, which, are stored in endpoint device RAM and/or ROM, specify the audio, video, data, and/or control capabilities for this endpoint device. Control processor 840 retrieves the capability codes from all N endpoint devices participating in a multimedia conference. These capability codes are stored in a memory unit (RAM) of MCU 810 so that control processor 840 can correctly manage the conference for all endpoint devices. This storage may occur, for example, in a random-access memory (RAM) device associated with control processor 840. In turn, MCU 810 sends the capability codes to each of the N communications ports 870, 872 so that each of the endpoint devices 801, 802, 803 are enabled to communicate with MCU 810 at a bit rate determined by MCU 810 and appropriate for that specific endpoint device 801, 802, 803.

Control processor 840 receives inputs which are entered by conference participants into the user interface of an endpoint device 801, 802, 803. These inputs are in the form of chair-control commands and commands embedded in bit streams conforming to the H.221 standard. Commands from endpoint devices are routed to the control processor 840 to ensure the correct distribution of bit streams to the audio, video, and data processors 841, 842, 843, respectively, to ensure that the correct audio decoding algorithm is used at the inputs to an audio mixer within audio processor 841, and to ensure that any incoming data is sent to a data broadcast unit or MLP processor within data processor 843.

The control processor 840 also directs the switching of the bit streams from the audio, video, and data processors 841, 842, 843, respectively, to each multiplexer 822, 834, and specifies the audio encoding algorithm used in the audio mixer of audio processor 841, and the algorithm used at each output from the audio mixer. The bit streams are routed to and from the various processors 841, 842, 843 by the common internal switch 819, which is under control of the control processor 840.

Video processor 842, which embodies the picture composition techniques of the present invention, processes the video signals received from the common internal switch 819. The processing may take the form of switching the video, mixing the video, or both. In video switching, the video processor 842 receives one selected video signal from the switch 819, and transmits the video signal to some or all other endpoint devices participating in a given multimedia conference. Video selection may be automatic or under manual control. For instance, the audio processor 841 and the video processor 842 may be automatically controlled by control processor 840, such that an endpoint device with currently active audio (i.e., an endpoint device used by the "present speaker" which provides an audio signal to MCU 810 above a predetermined audio amplitude threshold) receives the picture of the endpoint device which previously had active audio (i.e., an endpoint device used by the "previous speaker"), while all other endpoint devices receive the picture of the present speaker.

A time delay may be incorporated into the video switching implemented by video processor 842 to avoid excessively frequent video image changes caused by spurious sounds. As in the case of audio switching, video switching may be controlled directly from a specially-designated endpoint device used by a person termed the "chair". If the delay in the video processor 842 and the delay in the audio processor 841 differ by a significant (humanly perceptible) amount, a compensating delay may be inserted into the appropriate bit stream to retain lip synchronization.

In video mixing, the video processor 842 receives four selected video bitstreams from the switcher 819, and composites the four bitstreams into one video bitstream by using the picture composition system 100 of FIG. 1, or the system 700 of FIG. 7, which is embedded in the video processing unit. The composite bitstream 855 is fed to the common internal switch 819. Through the switch 819, the composite signal is switched to the proper endpoint devices via their corresponding communication ports under the control of the control processing unit 840. As in video-switching, the video selection may be automatic or under manual control.

What is claimed:

1. A compressed domain video composition system for integrating up to four coded video input bit streams into a composite video output bit stream in a compressed domain, the system comprising:

(a) a bit rate reduction device for selectively applying bit rate reduction to the up to four coded video input bit streams to generate a set of bit rate reduced video bit streams each having a corresponding rate-reduced bit rate, (b) a compositing device for combining the bit rate reduced video bit streams into the composite video output bit stream, the composite video output bit stream having a bit transfer rate equal to the sum of the rate-reduced bit rates, wherein the bit rate reduction device selectively applies rate reduction to any of the up to four coded video input bit streams so as to provide a composite video output bit stream having a desired bit transfer rate:

(c) up to four buffers for receiving a corresponding plurality of up to four coded video input bit streams;

(d) a synchronization and multiplexing device for synchronizing the up to four coded video input bit streams and multiplexing the up to four coded video input bit streams into a single, compressed, composite video output bit stream;

(e) for each of the up to four coded video input bit streams, a corresponding transmission rate reduction system wherein a first compressed video bit stream having a first transfer rate is converted into a second compressed video bit stream having a second transfer rate, the second transfer rate being slower than the first transfer rate, the transmission rate reduction system comprising:

(i) a video multiplex decoder for demultiplexing and decoding the first video bit stream to generate (a) quantized DCT coefficient microblocks representing a plurality of digitized frequency components for the first video bit stream, (b) motion vector pairs specifying a vertical displacement and a horizontal displacement for each microblock; and (c) header information specifying a starting point for a compressed video image, compressed video image synchronization information, and the location of each microblock or group of microblocks in the compressed video image;

(ii) a DCT coefficients processor for receiving quantized DCT coefficient microblocks from the video multiplex decoder and receiving quantization information from a rate control processor to generate a set of processed DCT coefficient microblocks containing fewer DCT coefficients than the number of coefficients in the quantized DCT coefficient microblocks received from the video multiplex decoder; and (iii) a video multiplex encoder for encoding requantized DCT coefficient microblocks obtained from the DCT coefficients processor, for encoding a motion vector obtained from the DCT coefficients processor, and for multiplexing header information with the encoded motion vector and encoded DCT coefficient microblocks to produce the second compressed video bit stream; and (f) a central rate control processor providing control information for the up to four DCT coefficients processors, the rate control processor comprising a processor for generating new quantization information for the up to four DCT coefficients processors, each DCT coefficients processor coupled to a transmission buffer, the new quantization information generated according to a transmission buffer status value specifying the number of available bits remaining in the video transmission buffer, and according to a desired bit rate for the composite video output bit stream.

2. A compressed domain video composition system as set forth in claim 1 wherein each of the up to four DCT coefficients processors further includes:

(a) a first inverse quantizer which, in response to the receipt of the quantized DCT coefficients and the quantization information from the video multiplex decoder, produces an output in the form of reconstructed DCT coefficients according to the quantization information;

(b) a quantizer which accepts the reconstructed DCT coefficients and a feedback DCT error signal to produce requantized DCT coefficients according to the new quantization information obtained from the rate control processor;

(c) a second inverse quantizer which receives the requantized DCT coefficients and produces reconstructed DCT coefficients based upon the new quantization information;

(d) a prediction frame storage device which stores a frame including a plurality of DCT coefficient blocks;

(e) a motion vector processor which receives a plurality of motion vector pairs from the video multiplex decoder and processes the motion vector pairs such that respective processed motion vector pairs are aligned with corresponding DCT coefficient blocks;

(f) a first summing device coupled to the output of the first inverse quantizer, the output of the frame storage device, and the input of the quantizer, for adding the output of the first inverse quantizer and the feedback DCT error signal from the output of the frame storage device to generate a sum if a coding mode of intercoding is used that incorporates a reference to a previously occurring frame, and applying the sum so generated to the input of the quantizer;

(g) a second summing device coupled to the first inverse quantizer and the second inverse quantizer for subtracting the output of the second inverse quantizer from the output of the first inverse quantizer to produce the DCT error signal and for applying the DCT error signal to the input of a third summing device;

(h) a third summing device coupled to the second summing device and the frame storage device for performing motion compensation for the DCT error signal.

3. A central rate control processor for use in a compressed domain video composition system including: (i) an input buffer for storing information from a plurality of coded video input bit streams, each coded video input bit stream having a corresponding input bit transfer rate, (ii) a bit rate reducing device coupled to the set of buffers for selectively reducing the bit transfer rates of any of the coded video input bit streams, (iii) a compositing device for combining the bit rate reduced video bit streams into the composite video output bit stream, (iv) a plurality of DCT coefficients processors, each DCT coefficients processor coupled to a corresponding coded video input bit stream, and (v) a multiple transmission buffer including a plurality of memory locations and coupled to the compositing device;

CHARACTERIZED IN THAT the central rate control processor includes:

(a) a control signal generator for generating multiple control signals causing the selective application of bit rate reduction to the plurality of coded video input bit streams to generate a set of bit rate reduced video bit streams each having a corresponding rate-reduced bit rate, so as to provide a composite video output bit stream having a desired bit transfer rate, and wherein the desired bit transfer rate is substantially equal to the sum of the bit rate reduced video bit streams, and (b) a monitoring device coupled to the multiple transmission buffer for monitoring the relative number of loaded memory locations in the multiple transmission buffer, the relative number of loaded memory locations denoted as the transmission buffer status value;

wherein the central rate control processor provides control information for the plurality of DCT coefficients processors, the rate control processor generating new quantization information for the plurality of DCT coefficients processors, each DCT coefficients processor coupled to the transmission buffer, the new quantization information generated according to the transmission buffer status value specifying the number of available bits remaining in the transmission buffer, and according to a desired bit rate for the composite video output bit stream.

* * * * *